United States Patent
Nakai et al.

(10) Patent No.: US 12,479,196 B2
(45) Date of Patent: Nov. 25, 2025

(54) LAMINATE, PACKAGING MATERIAL, AND FOOD PACKAGING MATERIAL

(71) Applicant: MITSUBISHI CHEMICAL CORPORATION, Tokyo (JP)

(72) Inventors: Masaya Nakai, Tokyo (JP); Kuniyasu Kato, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 65 days.

(21) Appl. No.: 17/837,474

(22) Filed: Jun. 10, 2022

(65) Prior Publication Data

US 2022/0297413 A1    Sep. 22, 2022

Related U.S. Application Data

(63) Continuation of application No. PCT/JP2020/049019, filed on Dec. 25, 2020.

(30) Foreign Application Priority Data

Dec. 26, 2019    (JP) .................. 2019-236045

(51) Int. Cl.
  B32B 27/30    (2006.01)
  B32B 27/08    (2006.01)
  B32B 27/32    (2006.01)
  B32B 38/16    (2006.01)

(52) U.S. Cl.
  CPC .......... B32B 27/306 (2013.01); B32B 27/08 (2013.01); B32B 27/32 (2013.01); B32B 38/162 (2013.01); B32B 2250/03 (2013.01); B32B 2250/24 (2013.01); B32B 2307/7246 (2013.01); B32B 2439/70 (2013.01)

(58) Field of Classification Search
  CPC .......... B29B 17/02; B29B 2017/0203; B29B 2017/0293; B29K 2029/04; B29L 2009/00; B32B 2250/03; B32B 2250/04; B32B 2250/05; B32B 2250/24; B32B 2255/10; B32B 2307/71; B32B 2307/724; B32B 2307/7242; B32B 2307/7246; B32B 2307/7265; B32B 2439/70; B32B 27/08; B32B 27/20; B32B 27/22; B32B 27/306; B32B 27/32; B32B 27/34; B32B 37/12; B32B 38/162; B32B 43/006; B32B 7/02; B32B 7/12; Y02W 30/62; Y02W 30/80; B65D 65/40
  See application file for complete search history.

(56) References Cited

U.S. PATENT DOCUMENTS

| | | |
|---|---|---|
| 4,963,426 A | 10/1990 | Nishimoto et al. |
| 2010/0055482 A1 | 3/2010 | Furukawa et al. |
| 2018/0346214 A1 | 12/2018 | Yamauchi et al. |

FOREIGN PATENT DOCUMENTS

| | | |
|---|---|---|
| CN | 108349642 A | 7/2018 |
| GB | 1 527 611 A | 10/1978 |
| JP | S51-98783 A | 8/1976 |
| JP | H1-225550 A | 9/1989 |
| JP | H4-29845 A | 1/1992 |
| JP | H4-115927 A | 4/1992 |
| JP | H6-198821 A | 7/1994 |
| JP | H7-186337 A | 7/1995 |
| JP | H1185034 A * | 3/1999 |
| JP | H11-129379 A | 5/1999 |
| JP | H11-348200 A | 12/1999 |
| JP | H11-348201 A | 12/1999 |
| JP | 2003-112393 A | 4/2003 |
| JP | 2006-124669 A | 5/2006 |
| JP | 2006-312313 A | 11/2006 |
| JP | 2008-12764 A | 1/2008 |
| JP | 2008-45078 A | 2/2008 |
| JP | 2009-184138 A | 8/2009 |
| JP | 2014-172632 A | 9/2014 |
| JP | 2017-115076 A | 6/2017 |
| JP | 2019-14137 A | 1/2019 |
| JP | 2019-181877 A | 10/2019 |
| JP | 2019-182463 A | 10/2019 |

OTHER PUBLICATIONS

Machine translation of JP H11-85034, Yamaguchi Mar. 20, 1999 (Year: 1999).*
ISR for PCT/JP2020/049019, dated Mar. 16, 2021.
IPRP for PCT/JP2020/049019, dated Jun. 28, 2022 (w/ translation).
ESR for EP App. No. 20904577.2, dated Jan. 12, 2023.
OA for CN App. No. 202080089992.3, dated Jun. 19, 2023 (w/ translation).
OA for CN App. No. 202080089992.3, dated Dec. 14, 2023 (w/ translation).
OA for CN App. No. 202080089992.3, dated Apr. 18, 2024 (w/ translation).
OA for JP App. No. 2021-567740, dated Jun. 25, 2024 (w/ translation).
OA for JP App. No. 2021-567740, dated Sep. 10, 2024 (w/ translation).

* cited by examiner

*Primary Examiner* — Alicia Bland
(74) *Attorney, Agent, or Firm* — Greenblum & Bernstein, P.L.C.

(57) ABSTRACT

A laminate is provided, which requires a shorter period of time for delamination thereof and hence is excellent in recoverability. The laminate includes a first outer layer, an intermediate layer, and a second outer layer which are disposed in this order. The intermediate layer contains a polyvinyl alcohol resin. A difference in water vapor transmission rate between the first outer layer and the second outer layer is not less than 100 cc·30 μm/m²·day, and the water vapor transmission rate of the first outer layer and the water vapor transmission rate of the second outer layer satisfy the following expression (1):

$$WVTR1 < WVTR2 \qquad (1)$$

wherein WVTR1 is the water vapor transmission rate of the first outer layer and WVTR2 is the water vapor transmission rate of the second outer layer.

8 Claims, No Drawings

LAMINATE, PACKAGING MATERIAL, AND FOOD PACKAGING MATERIAL

RELATED APPLICATIONS

This application is a continuation of International Application No. PCT/JP2020/049019, filed on Dec. 25, 2020, which claims priority to Japanese Patent Application No. 2019-236045, filed on Dec. 26, 2019, the entire contents of each of which being herein incorporated by reference.

TECHNICAL FIELD

The present disclosure relates to a laminate. Specifically, the present disclosure relates to a laminate for use as a packaging material or the like excellent in recoverability.

BACKGROUND ART

In recent years, stricter regulations have been enforced to control waste plastics in order to cope with a so-called microplastic problem and the like. So far, the waste plastics have been mostly exported to China and other nations, but now are collected type by type and recycled domestically.

Conventionally, the waste plastics are not collected type by type, but subjected to simple sorting before the export. In the future, however, the waste plastics will be collected type by type and precisely sorted to be regenerated for the domestic resource recycling.

Where the type-by-type collection and the precise sorting of the waste plastics are required, single-layer films produced from a single resin can be easily sorted, but it is very difficult to sort laminates produced by laminating plural types of resins.

Under such a circumstance, a laminate excellent in recyclability, mainly in recoverability, is proposed, which includes an intermediate layer of a water-soluble resin.

For example, PTL 1 and PTL 2 disclose laminates which each include an intermediate layer of a water-soluble ethylene-modified polyvinyl alcohol resin and a layer of a thermoplastic resin, and state that the thermoplastic resin layer can be separated from the intermediate layer and recovered after use.

Further, PTL 3, for example, proposes a laminate in which an intermediate layer containing wax is provided between a polyvinyl alcohol resin film and a base film for improvement of delamination property.

RELATED ART DOCUMENTS

Patent Documents

PTL 1: JP-A-HEI11(1999)-348200
PTL 2: JP-A-HEI11(1999)-348201
PTL 3: JP-A-2003-112393

SUMMARY

However, the laminates disclosed in PTL 1 and PTL 2 need improvement in delamination speed, because the delamination depends upon the water solubility of the ethylene-modified polyvinyl alcohol resin.

Where a polyolefin layer is used as the base film and is bonded to the polyvinyl alcohol resin film via the wax in PTL 3, the polyolefin layer can be easily delaminated. On the other hand, the separation of the polyolefin layer is liable to occur due to an insufficient bonding strength during distribution of the laminate or during use of the laminate. In particular, the viscosity of the wax is lowered in a high-temperature atmosphere. Therefore, it will be impossible to stably hold the polyolefin layer with a desired bonding strength in the laminate, for example, when the laminate is delivered in midsummer or when the laminate is used for a container of a hot beverage such as hot coffee.

In view of the foregoing, the present disclosure provides a laminate which requires a shorter period of time for the delamination thereof and is excellent in recoverability.

The laminate according to the present disclosure includes a first outer layer, an intermediate layer, and a second outer layer which are disposed in this order. The intermediate layer contains a polyvinyl alcohol resin. A difference in water vapor transmission rate between the first outer layer and the second outer layer is not less than 100 cc·30 $\mu m/m^2 \cdot day$, and the water vapor transmission rate of the first outer layer and the water vapor transmission rate of the second outer layer satisfy the following expression (1):

$$WVTR1 < WVTR2 \tag{1}$$

wherein WVTR1 is the water vapor transmission rate of the first outer layer and WVTR2 is the water vapor transmission rate of the second outer layer.

In the laminate according to the present disclosure, the first outer layer and the second outer layer have different properties and exhibit different behaviors with respect to water. Therefore, when the laminate is immersed in water, the first outer layer and the second outer layer are delaminated in a shorter period of time, whereby the intermediate layer of the polyvinyl alcohol resin is exposed to water and speedily dissolved in water. Therefore, the laminate is excellent in recoverability.

DESCRIPTION OF EMBODIMENTS

Embodiments of the present disclosure will hereinafter be described specifically. However, these embodiments are exemplary (typical) embodiments of the present disclosure, but the disclosure is not limited to these embodiments.

In the embodiments of the present disclosure, the term "main component" means that the proportion of the component is preferably not less than 50 wt. %, more preferably not less than 80 wt. %, still more preferably not less than 95 wt. %, particularly preferably 100 wt. %, based on the total amount (100 wt. %) of components of each layer.

A laminate according to an embodiment of the present disclosure includes a first outer layer, an intermediate layer containing a polyvinyl alcohol (hereinafter referred to as "PVA") resin, and a second outer layer, and a difference in water vapor transmission rate (hereinafter referred to as "WVTR") between the first outer layer and the second outer layer is not less than a specific range.

The difference between the WVTR of the first outer layer and the WVTR of the second outer layer is not less than 100 cc·30 $\mu m/m^2 \cdot day$, and the WVTR of the first outer layer and the WVTR of the second outer layer satisfy the above expression (1). The WVTR difference is preferably 150 to 1,000 cc·30 $\mu m/m^2 \cdot day$, particularly preferably 200 to 1,000 cc·30 $\mu m/m^2 \cdot day$, especially preferably 300 to 900 cc·30 $\mu m/m^2 \cdot day$. If the WVTR difference is excessively great, the second outer layer has an excessively high WVTR. Therefore, where the laminate is used as a packaging material, the packaging material is liable to have a poorer barrier property. If the WVTR difference is excessively small, the delamination period tends to be prolonged.

In the present disclosure, where the first outer layer and the second outer layer each have a single-layer structure, the expression "the difference between the WVTR of the first outer layer and the WVTR of the second outer layer" means a WVTR difference between the single first outer layer and the single second outer layer.

Where one of the first outer layer and the second outer layer has a single-layer structure and the other outer layer has a plural-layer structure, the expression "the difference between the WVTR of the first outer layer and the WVTR of the second outer layer" means a difference between the WVTR of the one outer layer and one WVTR selected from: (1) the WVTR of all the plural layers of the other outer layer; (2) the WVTR of some of the plural layers of the other outer layer; and (3) the WVTR of one of the plural layers of the other outer layer.

Where the first outer layer and the second outer layer each have a plural-layer structure, the expression "the difference between the WVTR of the first outer layer and the WVTR of the second outer layer" means a difference between one WVTR selected from: (1) the WVTR of all the plural layers of one of the outer layers; (2) the WVTR of some of the plural layers of the one outer layer; and (3) the WVTR of one of the plural layers of the one outer layer, and one WVTR selected from: (4) the WVTR of all the plural layers of the other outer layer; (5) the WVTR of some of the plural layers of the other outer layer; and (6) the WVTR of one of the plural layers of the other outer layer.

Next, the respective layers will be described.

<First Outer Layer>

In the embodiment of the present disclosure, the first outer layer of the laminate preferably has a WVTR of not greater than 100 cc·30 $\mu m/m^2 \cdot day$, more preferably 0.1 to 50 cc·30 $\mu m/m^2 \cdot day$, particularly preferably 2 to 30 cc·30 $\mu m/m^2 \cdot day$.

If the WVTR of the first outer layer is excessively great, the WVTR difference between the first outer layer and the second outer layer will be smaller, i.e., the behavioral difference between the first outer layer and the second outer layer with respect to water will be smaller and, therefore, a longer period of time tends to be required for the delamination of the first and second outer layers. If the WVTR of the first outer layer is excessively small, no particular negative influence will occur. Practically, the lower limit of the WVTR of the first outer layer is about 0.1 cc·30 $\mu m/m^2 \cdot day$.

In the present disclosure, the WVTR is measured in conformity with JIS Z0208 (1976), i.e., by sealing the mouth of a cup containing a desiccant with a layer (a single layer or plural layers) of the first outer layer to be measured, then allowing the cup to stand still in a constant-temperature constant-humidity apparatus at 40° C. at 90% RH, and calculating a water vapor transmission rate per unit area based on a change in the weight of the desiccant.

The first outer layer may have a single layer structure or a plural-layer structure including plural layers of different materials having different functions.

The plural-layer structure may include an outermost layer, an adhesive resin layer, a water-proof layer, an ultraviolet radiation prevention layer, a regrind layer, and the like. These layers may be properly selectively combined to be laminated to form the first outer layer.

Further, the outermost layer may be imparted with a design by printing, coloring, and the like.

The outermost layer of the first outer layer preferably contains a thermoplastic resin as a main component thereof. Examples of the thermoplastic resin include: polyolefins such as polyethylene, polypropylene, and EVOH; aromatic polyesters such as polyethylene terephthalate; and polyvinylidene chloride, polycarbonate, and polyacrylonitrile. These may be each used alone, or two or more of these may be used in combination.

Of these, the polyolefins are preferred, and the polyethylene is particularly preferred for excellent heat sealability.

The outermost layer of the first outer layer may optionally contain known additives in addition to the thermoplastic resin as the main component, as long as the effects of the present disclosure are not impaired, preferably as long as the effects of the present disclosure are not impaired and the food safety is ensured. Examples of the additives include plasticizer, filler, antiblocking agent, antioxidant, colorant, antistatic agent, UV absorber, lubricant, and adhesive resin. These may be each used alone, or two or more of these may be used in combination.

The outermost layer of the first outer layer typically has a thickness of 1 to 1,000 μm, preferably 10 to 500 μm, more preferably 15 to 200 μm, still more preferably 15 to 100 μm.

A resin contained as a main component of the adhesive resin layer of the first outer layer is not particularly limited, but a preferred example of the resin is a carboxyl-containing modified olefin polymer prepared by chemically bonding an unsaturated carboxylic acid or its anhydride to an olefin polymer by an addition reaction, a graft reaction or the like.

The adhesive resin layer typically has a thickness of 0.5 to 50 μm, more preferably 1 to 30 μm, particularly preferably 2 to 20 μm, especially preferably 3 to 10 μm. If the thickness of the adhesive resin layer is less than 0.5 μm, the adhesive resin layer is liable to have an insufficient adhesive force. If the thickness of the adhesive resin layer is greater than 50 μm, on the other hand, an insufficient mechanical strength and poor economy will result.

Where the first outer layer includes another layer in addition to the outermost layer, exemplary layered structures for the laminate are as follows:
 (a) The first outer layer (the outermost layer and the adhesive resin layer), the PVA resin layer, and the second outer layer
 (b) The first outer layer (the outermost layer, the water-proof layer, and the adhesive resin layer), the PVA resin layer, and the second outer layer
 (c) The first outer layer (the outermost layer, the regrind layer, and the adhesive resin layer), the PVA resin layer, and the second outer layer
 (d) The first outer layer (print, the outermost layer, and the adhesive resin layer), the PVA resin layer, and the second outer layer
 (e) The first outer layer (the outermost layer and a heat-seal layer), the PVA resin layer, and the second outer layer The first outer layer has a thickness that can prevent pin holes and the like to ensure the water vapor barrier property. Specifically, the thickness of the first outer layer is typically 1 to 1,000 μm, preferably 10 to 500 μm, more preferably 15 to 200 μm. If the thickness of the first outer layer is excessively small, the first outer layer is liable to be insufficient in moisture-proof property and water-proof property, and is liable to be broken with an insufficient mechanical strength. If the thickness of the first outer layer is excessively great, the secondary formation of the laminate tends to be difficult.

<Second Outer Layer>

In the embodiment of the present disclosure, the second outer layer of the laminate preferably has a WVTR of 200 to 1,000 cc·30 μm/m²·day, more preferably 300 to 900 cc·30 μm/m²·day, particularly preferably 400 to 800 cc·30 μm/m²·day.

If the WVTR of the second outer layer is excessively small, the WVTR difference between the first outer layer and the second outer layer will be smaller, i.e., the behavioral difference between the first outer layer and the second outer layer with respect to water will be smaller and, therefore, a longer period of time tends to be required for the delamination of the first and second outer layers. If the WVTR of the second outer layer is excessively great, the second outer layer is liable to transmit water vapor and, therefore, the PVA resin layer as the intermediate layer tends to have a poorer gas barrier property.

The WVTR of the second outer layer is measured in the same manner as the WVTR of the first outer layer. The WVTR is measured in conformity with JIS Z0208 (1976), i.e., by sealing the mouth of a cup containing a desiccant with a layer (a single layer or plural layers) of the second outer layer to be measured, then allowing the cup to stand still in a constant-temperature constant-humidity apparatus at 40° C. at 90% RH, and calculating a water vapor transmission rate per unit area based on a change in the weight of the desiccant.

The second outer layer may have a single layer structure or a plural-layer structure including plural layers of different materials having different functions.

The plural-layer structure may include an outermost layer, an adhesive resin layer, a water-proof layer, an ultraviolet radiation prevention layer, a regrind layer, and the like. These layers may be properly selectively combined to be laminated to form the second outer layer.

Further, the outermost layer may be imparted with a design by printing, coloring, and the like.

The outermost layer of the second outer layer preferably contains a thermoplastic resin as a main component thereof. Examples of the thermoplastic resin include: aliphatic polyesters such as polybutylene succinate, polybutylene adipate terephthalate, and polylactic acid; polyamides such as nylon 6; and polystyrenes. These may be each used alone, or two or more of these may be used in combination.

Particularly, the polyamides are preferred in terms of adhesive properties and mechanical properties.

The outermost layer of the second outer layer may optionally contain known additives in addition to the thermoplastic resin as the main component, as long as the effects of the present disclosure are not impaired, preferably as long as the effects of the present disclosure are not impaired and the food safety is ensured. Examples of the additives include plasticizer, filler, antiblocking agent, antioxidant, colorant, antistatic agent, UV absorber, lubricant, and adhesive agent. These may be each used alone, or two or more of these may be used in combination.

The outermost layer of the second outer layer typically has a thickness of 1 to 50 μm, preferably 2 to 20 μm, more preferably 3 to 10 μm, still more preferably 4 to 10 μm.

A resin contained as a main component of the adhesive resin layer of the second outer layer is not particularly limited, but a preferred example of the resin is a carboxyl-containing modified olefin polymer prepared by chemically bonding an unsaturated carboxylic acid or its anhydride to an olefin polymer by an addition reaction, a graft reaction or the like.

The adhesive resin layer typically has a thickness of 0.5 to 50 μm, preferably 1 to 30 μm, more preferably 2 to 20 μm, particularly preferably 3 to 10 μm. If the thickness of the adhesive resin layer is less than 0.5 μm, the adhesive resin layer is liable to have an insufficient adhesive force. If the thickness of the adhesive resin layer is greater than 50 μm, on the other hand, an insufficient mechanical strength and poor economy will result.

Where the second outer layer includes another layer in addition to the outermost layer, exemplary layered structures for the laminate are as follows:
(a) The first outer layer, the PVA resin layer, and the second outer layer (the adhesive resin layer and the outermost layer)
(b) The first outer layer, the PVA resin layer, and the second outer layer (the adhesive resin layer, the water-proof layer, and the outermost layer)
(c) The first outer layer, the PVA resin layer, and the second outer layer (the adhesive resin layer, the regrind layer, and the outermost layer)
(d) The first outer layer, the PVA resin layer, and the second outer layer (the adhesive resin layer, the outermost layer, and print)
(e) The first outer layer, the PVA resin layer, and the second outer layer (a heat-seal layer and the outermost layer)

The second outer layer has a thickness that can prevent pin holes and the like to ensure liquid impermeability. Specifically, the thickness of the second outer layer is typically 1 to 50 μm, preferably 2 to 20 μm, more preferably 3 to 10 μm. If the thickness of the second outer layer is excessively small, the second outer layer is liable to be insufficient in moisture-proof property and water-proof property, and is liable to be broken with an insufficient mechanical strength. If the thickness of the second outer layer is excessively great, the secondary formation of the laminate tends to be difficult.

<Intermediate Layer>

In the embodiment of the present disclosure, the intermediate layer is the PVA resin layer containing the PVA resin as the main component thereof.

The PVA resin contains a vinyl alcohol structural unit in a proportion corresponding to a saponification degree and an unsaponified vinyl acetate structural unit.

The PVA resin layer should have a thickness that can prevent pin holes and the like to ensure gas barrier properties. Specifically, the thickness of the PVA resin layer is typically 0.1 to 30 μm, preferably 1 to 10 μm, more preferably 2 to 5 μm. If the thickness of the PVA resin layer is excessively small, the PVA resin layer is liable to be insufficient in gas barrier property, and is liable to be broken with an insufficient mechanical strength. If the thickness of the PVA resin layer is excessively great, the secondary formation of the laminate tends to be difficult.

Examples of the PVA resin to be used for the PVA resin layer in the present disclosure include unmodified PVA, modified PVA prepared by copolymerizing monomers in production of a vinyl ester resin and saponifying the resulting vinyl ester resin, and post-modified PVA prepared by introducing a functional group into an unmodified PVA through post-modification. These may be each used alone, or two or more of these may be used in combination. The modification may be permitted, as long as the PVA resin does not lose its water solubility. In some case, the modified PVA may be further post-modified.

Exemplary monomers to be used for copolymerization with a vinyl ester monomer in the production of the vinyl ester resin include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, and salts, monoalkyl esters, and dialkyl esters of these unsaturated acids; nitriles such as acrylonitrile and methacrylonitrile; amides such as acrylamide and methacrylamide; olefin sulfonic acids such as ethylenesulfonic acid, allylsulfonic acid, and methallylsulfonic acid, and salts of these olefin sulfonic acids; alkyl vinyl ethers; N-acrylamide methyl trimethylammonium chloride, allyltrimethylammonium chloride, dimethylallyl vinyl ketone, N-vinylpyrrolidone, vinyl chloride, and vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxyl-containing α-olefins such as 3-buten-1-ol, 4-penten-1-ol, and 5-hexen-1-ol, and acylation products and other derivatives of these hydroxyl-containing α-olefins.

Other exemplary monomers include diol-containing compounds such as 3,4-dihydroxy-1-butene, 3,4-diacyloxy-1-butenes, 3-acyloxy-4-hydroxy-1-butenes, 4-acyloxy-3-hydroxy-1-butenes, 3,4-diacyloxy-2-methyl-1-butenes, 4,5-dihydroxy-1-pentene, 4,5-diacyloxy-1-pentenes, 4,5-dihydroxy-3-methyl-1-pentene, 4,5-diacyloxy-3-methyl-1-pentenes, 5,6-dihydroxy-1-hexene, 5,6-diacyloxy-1-hexenes, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

These may be each used alone, or two or more of these may be used in combination.

Examples of the post-modified PVA containing a functional group introduced by the post-modification include modified PVA resin containing an acetoacetyl group introduced by a reaction with a diketene, modified PVA resin containing a polyalkylene oxide group introduced by a reaction with ethylene oxide, modified PVA resin containing a hydroxyalkyl group introduced by a reaction with an epoxy compound, and modified PVA resin prepared by a reaction of a PVA resin with an aldehyde compound having a desired functional group. These may be each used alone, or two or more of these may be used in combination.

The PVA resin to be used in the present disclosure is preferably suitable for melt-forming.

Preferred examples of the PVA resin suitable for the melt-forming include PVA resin having a structural unit containing a primary hydroxyl group in its side chain, and ethylene-modified PVA resin. Particularly, the PVA resin having the structural unit containing the primary hydroxyl group in its side chain is preferred because of its excellent melt formability and water solubility. The number of primary hydroxyl groups in the structural unit is typically 1 to 5, preferably 1 to 2, particularly preferably 1. Further, the PVA resin preferably has a secondary hydroxyl group in addition to the primary hydroxyl group.

Examples of the PVA resin having the structural unit containing the primary hydroxyl group in its side chain include modified PVA resin having a 1,2-diol structural unit in its side chain, and modified PVA resin having a hydroxyalkyl group in its side chain. Particularly, a modified PVA resin having the 1,2-diol structural unit in its side chain and represented by the following general formula (2) (hereinafter sometimes referred to as "the modified PVA resin containing the side-chain 1,2-diol structural unit") is preferably used.

Like an ordinary PVA resin, the modified PVA resin has a vinyl alcohol structural unit and an unsaponified vinyl ester structural unit in addition to the 1,2-diol structural unit.

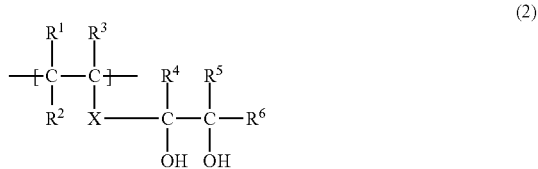

wherein $R^1$ to $R^6$ each independently represent a hydrogen atom or a C1 to C4 alkyl group, and X represents a single bond or a bonding chain.

In the above general formula (2), $R^1$ to $R^6$ each independently represent a hydrogen atom or a C1 to C4 alkyl group. Particularly, $R^1$ to $R^6$ are preferably all hydrogen atoms so that all the side-chain terminals are primary hydroxyl groups. However, $R^1$ to $R^6$ may be C1 to C4 alkyl groups, as long as the properties of the resin are not significantly impaired. The alkyl group is not particularly limited, but examples thereof include methyl group, ethyl group, n-propyl group, isopropyl group, n-butyl group, isobutyl group, and tert-butyl group. These alkyl groups may each be substituted with a substituent such as halogen group, hydroxyl group, ester group, carboxylic acid group or sulfonic acid group as required.

In the above general formula (2), X is a single bond or a bonding chain. Preferably, X is a single bond from the viewpoint of the thermal stability and the stability at a higher temperature or under acidic conditions. The bonding chain is not particularly limited, but examples thereof include hydrocarbon chains such as alkylenes, alkenylenes, alkynylenes, phenylene, and naphthylene (which may be substituted with a halogen such as fluorine, chlorine or bromine), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$, —OTi(OR)$_2$, —OTi(OR)$_2$O—, —Al(OR)—, —OAl(OR)—, and —OAl(OR)O—, wherein R is independently a hydrogen atom or a given substituent, preferably a hydrogen atom or an alkyl group (particularly, a C1 to C4 alkyl group), and m is a natural number, preferably 1 to 10, particularly preferably 1 to 5.

From the viewpoint of the stability of the viscosity during production, the heat resistance, and the like, an alkylene group having a carbon number of not greater than 6 is preferred, and methylene group or —CH$_2$OCH$_2$— is particularly preferred.

In the 1,2-diol structural unit represented by the general formula (2), it is particularly preferred that $R^1$ to $R^6$ are all hydrogen atoms, and X is a single bond.

The PVA resin to be used in the present disclosure typically has a saponification degree of 60 to 100 mol % (as measurement in conformity with JIS K6726).

The preferred range of the saponification degree varies depending upon the type of the modifying group. In the case of the unmodified PVA resin, for example, the saponification degree is typically 60 to 99.9 mol %, preferably 65 to 95 mol %, particularly preferably 70 to 90 mol %. If the saponification degree is excessively high, the melting point and the decomposition temperature are close to each other, so that the melt-forming tends to be difficult. If the saponification degree is excessively low, the water solubility tends to be reduced.

In the case of the modified PVA resin containing the side-chain 1,2-diol structural unit, the saponification degree is typically 60 to 99.9 mol %, preferably 65 to 99.8 mol %, particularly preferably 70 to 99.5 mol %. If the saponification degree is excessively low, the water solubility tends to be reduced.

In the case of an ethylene-modified PVA resin prepared by modification with a small amount of ethylene, the saponification degree is typically not less than 60 mol %, preferably 70 to 95 mol %, particularly preferably 75 to 90 mol %. If the saponification degree is excessively high, the melting point and the decomposition temperature are close to each other, so that the melt-forming tends to be difficult. If the saponification degree is excessively low, the water solubility tends to be reduced.

The PVA resin to be used in the present disclosure typically has an average polymerization degree of 100 to 3,000, preferably 150 to 2,000, particularly preferably 180 to 1,000, still more preferably 200 to 800 (as measured in conformity with JIS K6726). If the average polymerization degree is excessively great, the PVA resin is liable to have a higher melt viscosity in the melt-forming, so that the melt-forming tends to be difficult.

Where the PVA resin is the modified PVA resin, the modification degree of the modified PVA resin, i.e., the proportion of each monomer structural unit in the copolymer or the proportion of the functional group introduced by the post-modification, significantly varies depending upon the type of the functional group and cannot be unconditionally specified, but is typically 0.1 to 20 mol %.

Where the PVA resin is the modified PVA resin containing the side-chain 1,2-diol structural unit, the modification degree is typically 0.1 to 20 mol %, preferably 0.5 to 10 mol %, particularly preferably 1 to 8 mol %. If the modification degree is excessively high or low, the melt-forming tends to be difficult.

The proportion of the 1,2-diol structural unit of the PVA resin can be determined based on $^1$H-NMR spectrum of a PVA resin having a saponification degree of 100 mol % (by using DMSO-d6 as a solvent and tetramethylsilane as an internal standard). Specifically, the proportion of the 1,2-diol structural unit is calculated based on peak areas attributable to hydroxyl proton, methine proton, and methylene proton of the 1,2-diol structural unit, methylene proton of the main chain, and proton of hydroxyl group bonded to the main chain.

Where the PVA resin is the ethylene-modified PVA resin prepared by the modification with a small amount of ethylene, the modification degree is typically 0.1 to 15 mol %, preferably 0.5 to 10 mol %, more preferably 1 to 10 mol %, particularly preferably 5 to 9 mol %. If the modification degree is excessively high, water solubility tends to be reduced. If the modification degree is excessively low, the melt-forming tends to be difficult.

The PVA resin typically has a melting point of 140° C. to 230° C., preferably 145° C. to 220° C., more preferably 180° C. to 200° C., particularly preferably 150° C. to 200° C., still more preferably 155° C. to 190° C.

The melting point is measured at a temperature increase rate of 10° C./minute by a differential scanning calorimeter (DSC).

In the present disclosure, the aforementioned PVA resins may be each used alone as the PVA resin, or two or more of the aforementioned PVA resins may be used in the form of mixture as the PVA resin. Where the two or more of the PVA resins are used in combination, exemplary combinations include: a combination of two or more unmodified PVA resins having different saponification degrees, different average polymerization degrees, and different melting points; a combination of an unmodified PVA resin and a modified PVA resin; and a combination of two or more modified PVA resins having different saponification degrees, different average polymerization degrees, different melting points, different functional groups, and different modification degrees. The average of the different saponification degrees, the average of the different average polymerization degrees, and the average of the different modification degrees preferably respectively fall within the preferred ranges specified in the present disclosure.

The PVA resin to be used in the present disclosure mainly contains 1,3-diol bonds in its main chain, and the 1,2-diol bond content is about 1.5 to 1.7 mol %. However, the 1,2-diol bond content can be increased to not less than 1.8 mol % and further to 2.0 to 3.5 mol % by performing the polymerization of the vinyl ester monomer at a higher polymerization temperature.

An exemplary method for producing the PVA resin to be used in the present disclosure is to polymerize a vinyl ester monomer such as vinyl acetate and then saponify the resulting polymer.

Usable examples of the vinyl ester monomer include vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of the costs and the availability, vinyl acetate is preferably used. The PVA resin is produced by polymerizing any of these vinyl ester monomers, and saponifying the resulting polymer.

The modified PVA resin containing the side-chain 1,2-diol structural unit can be produced by a known production method. For example, methods described in JP-A-2002-284818, JP-A-2004-285143, and JP-A-2006-95825 may be employed for the production.

In the present disclosure, a single type of PVA resin may be used alone, or a mixture of plural types of PVA resins may be used as the PVA resin. Where the mixture is used, the average of the saponification degrees and the average of the polymerization degrees of the plural types of PVA resins preferably respectively fall within the aforementioned ranges.

Further, the PVA resin layer may contain a water-soluble resin or a water dispersible resin in addition to the PVA resin, as long as the water solubility is ensured and the melt-formability is not impaired. Examples of the water-soluble or water-dispersible resin to be used in combination with the PVA resin include: starch, and starch derivatives such as oxidized starch and cation-modified starch; natural proteins such as gelatin and casein; cellulose derivatives such as methylcellulose, ethylcellulose, hydroxyethylcellulose, and carboxymethylcellulose; natural polymer polysaccharides such as sodium alginate and pectic acid; polyvinylpyrrolidone, poly(meth)acrylic acid salts, and other water-soluble resins; and SBR latex, NBR latex, vinyl acetate resin emulsion, ethylene-vinyl acetate copolymer emulsion, (meth) acrylic ester resin emulsion, vinyl chloride resin emulsion, and urethane resin emulsion. These may be each used alone, or two or more of these may be used in combination. In order to improve the adhesion between the first outer layer and the second outer layer, the PVA resin layer may contain an adhesive resin.

<Laminate>

As described above, the laminate according to the embodiment of the present disclosure is such that the first outer layer, the intermediate layer, and the second outer layer are disposed in this order. The first outer layer is a part of the laminate excluding the intermediate layer and the second outer layer. The second outer layer is a part of the laminate excluding the intermediate layer and the first outer layer.

In the laminate according to the embodiment of the present disclosure, as described above, the intermediate layer contains the PVA resin, and the difference between the WVTR of the first outer layer and the WVTR of the second outer layer is not less than 100 cc·30 μm/m²·day.

In particular, the difference between the WVTR of the outermost layer of the first outer layer and the WVTR of the outermost layer of the second outer layer is preferably not less than 100 cc·30 μm/m²·day, more preferably 150 to 1,000 cc·30 μm/m²·day, particularly preferably 200 to 1,000 cc·30 μm/m²·day, especially preferably 300 to 900 cc·30 μm/m²·day.

The outermost layer is located at the outermost position among the layers of the laminate. Where the outer layers each have a single-layer structure, the outer layer serves as the outermost layer. Where the outer layers each have a plural-layer structure, a layer of the plural-layer structure located farthest from the intermediate layer serves as the outermost layer.

A difference between the WVTR of a double-layer portion including the outermost layer and its adjacent layer of the first outer layer and the WVTR of the outermost layer of the second outer layer and/or a difference between the WVTR of the double-layer portion including the outermost layer and its adjacent layer of the first outer layer and the WVTR of a double-layer portion including the outermost layer and its adjacent layer of the second outer layer is preferably not less than 100 cc·30 μm/m²·day, more preferably 150 to 1,000 cc·30 μm/m²·day, particularly preferably 200 to 1,000 cc·30 μm/m²·day, especially preferably 300 to 900 cc·30 μm/m²·day. Further, a difference between the WVTR of the double-layer portion including the outermost layer and its adjacent layer of the second outer layer and the WVTR of the outermost layer of the first outer layer and/or a difference between the WVTR of the double-layer portion including the outermost layer and its adjacent layer of the second outer layer and the WVTR of the double-layer portion including the outermost layer and its adjacent layer of the first outer layer also preferably falls within the aforementioned numerical range.

Further, a difference between the WVTR of a double-layer portion including the outermost layer and its adjacent adhesive resin layer of the first outer layer and the WVTR of the outermost layer of the second outer layer and/or a difference between the WVTR of the double-layer portion including the outermost layer and its adjacent adhesive resin layer of the first outer layer and the WVTR of a double-layer portion including the outermost layer and its adjacent adhesive resin layer of the second outer layer is preferably not less than 100 cc·30 μm/m²·day, more preferably 150 to 1,000 cc·30 μm/m²·day, particularly preferably 200 to 1,000 cc·30 μm/m²·day, especially preferably 300 to 900 cc·30 μm/m²·day. Further, a difference between the WVTR of the double-layer portion including the outermost layer and its adjacent adhesive resin layer of the second outer layer and the WVTR of the outermost layer of the first outer layer and/or a difference between the WVTR of the double-layer portion including the outermost layer and its adjacent adhesive resin layer of the second outer layer and the WVTR of the double-layer portion including the outermost layer and its adjacent adhesive resin layer of the first outer layer also preferably falls within the aforementioned numerical range.

Further, a difference between the WVTR of all the layers of the first outer layer and the WVTR of all the layers of the second outer layer is preferably not less than 100 cc·30 μm/m²·day, more preferably 150 to 1,000 cc·30 μm/m²·day, particularly preferably 200 to 1,000 cc·30 μm/m²·day, especially preferably 300 to 900 cc·30 μm/m²·day.

In the embodiment of the present disclosure, the thickness of the laminate is not particularly limited, but is, for example, 3 to 1,000 μm, preferably 10 to 500 μm, more preferably 20 to 200 μm, in order to provide remarkable effects of the present disclosure.

<Laminate Production Method>

The laminate according to the present disclosure can be produced by a conventionally known forming method, specifically by a melt-forming method or a solution forming method. Examples of the melt-forming method include: a method in which a film or a sheet of the resin for the first outer layer is laminated sequentially or simultaneously with the adhesive resin for the first outer layer, the PVA resin for the intermediate layer, and the resin (e.g., a polyamide resin) for the second outer layer by melt-extrusion; a method in which a film or a sheet of the resin for the second outer layer is laminated sequentially or simultaneously with the PVA resin for the intermediate layer, the adhesive resin for the first outer layer, and the resin (e.g., an aliphatic polyester resin) for the first outer layer by melt-extrusion; and a method in which the resin and the adhesive resin for the first outer layer, the PVA resin for the intermediate layer, and the resin for the second outer layer are coextruded or coinjected.

In the solution forming method, a film or a sheet for the first outer layer or the second outer layer is coated with a solution prepared by dissolving the adhesive resin in a good solvent and dried, then further coated with an aqueous solution of the PVA resin, and a film or a sheet for the second outer layer or the first outer layer is put on the resulting coating layer.

In particular, the melt-forming method is preferred, and the coextrusion method is particularly preferred, because a laminate excellent in interlayer adhesion can be produced by a single step. Where the melt-forming method is employed, it is preferred to use the PVA resin containing the 1,2-diol structure in its side chain.

Specific examples of the coextrusion method include inflation method, T-die method, multi-manifold die method, feed block method, and multi-slot die method. Exemplary dies to be used for a die-outside bonding method or the like include T-die and round die.

A melt-forming temperature for the melt-forming is typically 190° C. to 250° C., preferably in a range of 200° C. to 230° C.

<Packaging Material>

A packaging material according to the embodiment of the present disclosure includes the laminate described above. Specifically, preferred examples of the packaging material include containers such as bags, cups, trays, tubes, and bottles, and caps formed by using the laminate. The packaging material is particularly advantageous for food packaging. The packaging material for the food packaging is useful as various packaging materials for general foods, condiments such as mayonnaise and dressing, fermented foods such as miso, fat and oil such as salad oil, and beverages.

Since the PVA resin having the 1,2-diol structure in its side chain has gas barrier properties, the packaging material according to the embodiment of the present disclosure can be advantageously used for a packaging material requiring the barrier properties.

The packaging material according to the embodiment of the present disclosure may be, for example, such that the second outer layer is to be brought into contact with food or other product to be packaged and the first outer layer is to be exposed to the outside air. Alternatively, the packaging material may be such that the first outer layer is to be brought into contact with food or other product to be packaged and the second outer layer is to be exposed to the outside air.

The laminate and the packaging material according to the embodiment of the present disclosure are excellent in recyclability. For example, cut-off pieces resulting from the sheet forming of the laminate and the laminate after use are immersed and stirred in water to be delaminated, whereby the first outer layer and the second outer layer can be separately recovered.

<Recycling Method for Laminate and the Like>

The embodiment of the present disclosure further provides an advantageous recycling method for separately recovering the constituent materials of the laminate.

More specifically, the advantageous recycling method according to the embodiment of the present disclosure is adapted for recycling the laminate including the first outer layer, the intermediate layer, and the second outer layer, which are laminated in this order, wherein the intermediate layer contains the polyvinyl alcohol resin, and the difference between the WVTR of the first outer layer and the WVTR of the second outer layer is not less than 100 cc·30 μm/m²·day, for recycling the packaging material including the laminate, and for recycling the food packaging material including the laminate, and the recycling method includes the steps of: washing the laminate, the packaging material or the food packaging material with a solvent containing water; and separating the first outer layer and the second outer layer from each other.

Another advantageous recycling method according to the embodiment of the present disclosure is adapted for recycling the laminate including the first outer layer, the intermediate layer, and the second outer layer, which are laminated in this order, wherein the intermediate layer contains the polyvinyl alcohol resin, and the WVTR (WVTR1) of the first outer layer and the WVTR (WVTR2) of the second outer layer satisfy the following expression (1):

$$WVTR1 < WVTR2 \tag{1},$$

for recycling the packaging material including the laminate, and for recycling the food packaging material including the laminate, and the recycling method includes the steps of: washing the laminate, the packaging material or the food packaging material with a solvent containing water; and separating the first outer layer and the second outer layer from each other.

A particularly advantageous recycling method according to the preferred embodiment of the present disclosure is adapted for recycling the laminate including the first outer layer, the intermediate layer, and the second outer layer, which are laminated in this order, wherein the intermediate layer contains the polyvinyl alcohol resin, wherein the difference between the WVTR of the first outer layer and the WVTR of the second outer layer is not less than 100 cc·30 μm/m²·day and the WVTR (WVTR1) of the first outer layer and the WVTR (WVTR2) of the second outer layer satisfy the following expression (1):

$$WVTR1 < WVTR2 \tag{1},$$

for recycling the packaging material including the laminate, and for recycling the food packaging material including the laminate, and the recycling method includes the steps of: washing the laminate, the packaging material or the food packaging material with a solvent containing water; and separating the first outer layer and the second outer layer from each other.

In these recycling methods, the first outer layer and the second outer layer, which are constituents of the laminate and the packaging materials, can be speedily separated from each other and, therefore, the PVA resin layer is exposed to water to be thereby speedily dissolved in water. Thus, the recycling methods are very useful because the waste plastics can be easily recovered.

EXAMPLES

The embodiment of the present disclosure will hereinafter be described specifically by way of examples thereof. However, it should be understood that the present disclosure be not limited to the examples within the scope of the present disclosure.

In the following examples, "parts" and "%" are based on weight, unless otherwise specified.

Example 1

(1) Preparation of PVA Resin

First, 68.0 parts of vinyl acetate, 23.8 parts of methanol, and 8.2 parts of 3,4-diacetoxy-1-butene were fed into a reaction vessel provided with a reflux condenser, a dropping funnel, and a stirrer, and then azobisisobutyronitrile was fed into the reaction vessel in an amount of 0.3 mol % (based on the amount of the fed vinyl acetate). The resulting mixture was stirred in a nitrogen stream with its temperature increased, whereby polymerization was started. When the polymerization degree of vinyl acetate reached 90%, m-dinitrobenzene was added to the resulting mixture to terminate the polymerization. Subsequently, methanol vapor was blown into the resulting mixture, whereby unreacted vinyl acetate monomer was removed to the outside. Thus, a methanol solution of a copolymer was obtained.

In turn, the methanol solution was further diluted with methanol to a concentration of 45%, and the resulting methanol solution was fed into a kneader. While the temperature of the solution was maintained at 35° C., sodium hydroxide in the form of a 2% methanol solution was added in a proportion of 10.5 mmol based on 1 mol of the total of the vinyl acetate structural unit and the 3,4-diacetoxy-1-butene structural unit of the copolymer to the methanol solution for saponification of the copolymer. As the saponification proceeded, a saponification product was precipitated. The resulting particulate precipitate was filtered, rinsed with methanol, and dried in a hot air drying apparatus. Thus, a PVA resin containing a side-chain 1,2-diol structural unit represented by the general formula (2) was prepared. In the 1,2-diol structural unit represented by the general formula (2) in the PVA resin thus prepared, $R^1$ to $R^6$ are each a hydrogen atom, and X is a single bond.

The PVA resin thus prepared had a saponification degree of 99.2 mol % as determined by analyzing an alkali consumption required for hydrolysis of remaining vinyl acetate and 3,4-diacetoxy-1-butene.

Further, the PVA resin had an average polymerization degree of 450 as analyzed in conformity with JIS K6726.

The proportion of the 1,2-diol structural unit represented by the general formula (2) was 6 mol % as calculated based on an integration value measured by $^1$H-NMR (by means of a 300 MHz proton NMR with the use of a d6-DMSO solution and an internal standard substance of tetramethylsilane at 50° C.).

(2) Measurement of Water Vapor Transmission Rate (WVTR)

In conformity with JIS Z0208 (1976), the water vapor transmission rate was measured by sealing the mouth of a cup containing a desiccant with a measurement sample of the first outer layer or the second outer layer, allowing the cup to stand still in a constant-temperature constant-humidity apparatus at 40° C. at 90% RH, calculating a water vapor transmission rate per unit area based on a change in the weight of the desiccant, and converting the calculated water vapor transmission rate into a value for a thickness of 30 μm.

Specifically, in conformity with JIS Z0208 (1976), 70-mm diameter measurement samples of the first outer layer and the second outer layer were each prepared, and set on a permeation cup containing about 10 g of calcium chloride. The resulting permeation cup was put in a constant-temperature constant-humidity apparatus (LH21-11M available from Nagano Science Co., Ltd.) at a temperature of 40° C. at a humidity of 90% RH, and allowed to stand still for 24 hours. The weight of the desiccant was measured before and after the 24-hour stand-still period, and the water vapor transmission rate was calculated based on an increase in the weight of the desiccant, and converted into a value for a thickness of 30 μm (multiplied by [a measurement sample thickness (μm)/30 μm]). Thus, the WVTR of the first outer layer and the WVTR of the second outer layer were determined.

In Examples and Comparative Examples, single-layer films formed of resins used for the outermost layers of the first outer layer and the second outer layer, respectively, were used as the measurement samples of the first outer layer and the second outer layer for the determination of the WVTR of the first outer layer and the WVTR of the second outer layer. The results are shown in Table 1.

(3) Production of Laminate

A polyethylene (NOVATEC UF960 available from Japan Polypropylene Corporation) was used as a resin for the outermost layer of the first outer layer. A modified polyolefin (Modic M533 available from Mitsubishi Chemical Corporation) was used as a resin for the adhesive resin layer of the first outer layer. A polyamide (Novamid 2030J available from DSM) was used as a resin for the second outer layer. The PVA resin prepared in the aforementioned manner was used for the PVA resin layer serving as the intermediate layer. A laminate of a four-type four-layer structure including a polyethylene layer, an adhesive resin layer, a PVA resin layer, and a polyamide layer was produced by means of a four-type five-layer multilayer film forming apparatus including four extruders.

The following temperature settings were employed for the respective extruders.

[Temperature Settings]

In the following description, C1 to C4 mean cylinders, H means a head, J means a joint, FD1 and FD2 mean front dies, and D1 to D3 mean dies.

Polyamide:
C1/C2/C3/C4/H/J=200° C./225° C./230° C./235° C./230° C./220° C.

PVA Resin:
C1/C2/C3/C4/H/J=180° C./200° C./210° C./210° C./210° C./210° C.

Polyethylene:
C1/C2/C3/C4/H/J=190° C./210° C./210° C./220° C./220° C./220° C.

Adhesive Resin:
C1/C2/C3/C4/H/J=190° C./210° C./210° C./220° C./220° C./220° C.

Dies: FD1/FD2/D1/D2/D3=220° C.

Roll: 60° C.

(4) Evaluation (Delamination Period)

A test piece was prepared by cutting the thus produced laminate into a 2-cm square. After 600 ml of water was put in a 750-mL container and heated to 40° C., the test piece was immersed in the water and stirred at 400 rpm. The time required for completely separating the first outer layer and the second outer layer from each other was measured by a stopwatch. The results are shown in Table 1.

Example 2

A composition containing 80 parts of the PVA resin prepared in the aforementioned manner and 20 parts of a polybutylene adipate terephthalate (PBAT, ECOFLEX available from BASF SE) was used instead of the PVA resin for the intermediate layer. Except for this, a laminate was produced in substantially the same manner as in Example 1 (as having a structure including a polyethylene layer, an adhesive resin layer, a layer of the composition containing the PVA resin and the PBAT, and a polyamide layer). The laminate was evaluated in the same manner as in Example 1. The results are shown in Table 1.

Comparative Example 1

The first outer layer and the second outer layer were each formed of a polyamide (Novamid 2030J available from DSM). Except for this, a laminate was produced in substantially the same manner as in Example 1 (as having a structure including a polyamide layer, a PVA resin layer, and a polyamide layer). The laminate was evaluated in the same manner as in Example 1. The results are shown in Table 1.

Comparative Example 2

The first outer layer and the second outer layer were each formed of a polyamide (Novamid 2030J available from DSM). Except for this, a laminate was produced in substantially the same manner as in Example 2 (as having a structure including a polyamide layer, a layer of the composition containing the PVA resin and the PBAT, and a polyamide layer). The laminate was evaluated in the same manner as in Example 1. The results are shown in Table 1.

Comparative Example 3

The second outer layer had a double-layer structure including an outermost layer and an adhesive resin layer. A polyethylene (NOVATEC UF960 available from Japan Polypropylene Corporation) was used as a resin for the outermost layer of the second outer layer, and a modified polyolefin (Modic M533 available from Mitsubishi Chemical Corporation) was used as a resin for the adhesive resin layer of the second outer layer. Except for this, a laminate was produced in substantially the same manner as in Example 1 (as having a structure including a polyethylene layer, an adhesive resin layer, a PVA resin layer, an adhesive resin layer, and a polyethylene layer). The laminate was evaluated in the same manner as in Example 1. The results are shown in Table 1.

Comparative Example 4

A polypropylene (NOVATEC EA7AD available from Japan Polypropylene Corporation) was used as a resin for the outermost layer of the first outer layer. The second outer layer had a double-layer structure including an outermost layer and an adhesive resin layer. A polypropylene (NOVATEC EA7AD available from Japan Polypropylene Corporation) was used as a resin for the outermost layer of the second outer layer, and a modified polyolefin (Modic M533 available from Mitsubishi Chemical Corporation) was used as a resin for the adhesive resin layer of the second outer layer. Except for this, a laminate was produced in substantially the same manner as in Example 1 (as having a structure including a polypropylene layer, an adhesive resin layer, a PVA resin layer, an adhesive resin layer, and a polypropylene layer). The laminate was evaluated in the same manner as in Example 1. The results are shown in Table 1.

TABLE 1

| Layered structure | Example 1 | Example 2 | Comparative Example 1 | Comparative Example 2 | Comparative Example 3 | Comparative Example 4 |
|---|---|---|---|---|---|---|
| First outer layer | | | | | | |
| Material | Polyethylene | Polyethylene | Polyamide | Polyamide | Polyethylene | Polypropylene |
| WVTR (cc · 30 μm/m² · day) | 18 | 18 | 507 | 507 | 18 | 8 |
| Thickness (μm) | 44 | 43 | 7 | 7 | 24 | 15 |
| Intermediate layer | | | | | | |
| Material | PVA 1 | PVA + PBAT | PVA 1 | PVA + PBAT | PVA 1 | PVA 1 |
| Thickness (μm) | 3 | 3 | 3 | 3 | 3 | 2 |
| Second outer layer | | | | | | |
| Material | Polyamide | Polyamide | Polyamide | Polyamide | Polyethylene | Polypropylene |
| WVTR (cc · 30 μm/m² · day) | 507 | 507 | 507 | 507 | 18 | 8 |
| Thickness (μm) | 7 | 7 | 7 | 7 | 26 | 5 |
| Evaluation | | | | | | |
| Delamination Period (minutes) | 7 | 9 | 25 | 20 | >7 hours | 180 |

The laminates of Examples 1 and 2 according to the embodiment of the present disclosure were excellent in recoverability with a delamination period of not longer than 10 minutes. On the other hand, the laminates of Comparative Examples 1 to 4 each including a first outer layer and a second outer layer formed of the same resin were poorer in recoverability with a delamination period of 20 minutes or longer.

While specific forms of the embodiment of the present disclosure have been shown in the aforementioned examples, the examples are merely illustrative but not limitative. It is contemplated that various modifications apparent to those skilled in the art could be made within the scope of the disclosure.

The laminate according to the present disclosure is advantageous in that the first outer layer and the second outer layer thereof can be speedily separated from each other simply by immersing the laminate in water. This makes it possible to recover waste plastics. Therefore, the laminate according to the present disclosure is advantageously used for a packaging material, particularly for a food packaging material.

The invention claimed is:

1. A recycling method for recycling a laminate having a first outer layer, an intermediate layer, and a second outer layer which are disposed in this order, wherein:
   the intermediate layer comprises a polyvinyl alcohol resin,
   the polyvinyl alcohol resin has an average polymerization degree of 100 to 3,000,
   the polyvinyl alcohol resin has a modification degree of 0.1 to 20 mol % and contains a structural unit having a primary hydroxyl group in its side chain, and
   a difference in water vapor transmission rate between the first outer layer and the second outer layer is not less than 100 cc·30 μm/m²·day,
   the recycling method comprising:
   washing the laminate with a solvent containing water; and
   separating the first outer layer and the second outer layer from each other.

2. A recycling method for recycling a laminate having a first outer layer, an intermediate layer, and a second outer layer which are disposed in this order, wherein:
   the intermediate layer comprises a polyvinyl alcohol resin,
   the polyvinyl alcohol resin has an average polymerization degree of 100 to 3,000,
   the polyvinyl alcohol resin has a modification degree of 0.1 to 20 mol % and contains a structural unit having a primary hydroxyl group in its side chain, and
   a water vapor transmission rate of the first outer layer and a water vapor transmission rate of the second outer layer satisfy the following expression (1):

$$WVTR1 < WVTR2 \qquad (1)$$

wherein:
   WVTR1 is the water vapor transmission rate of the first outer layer, and
   WVTR2 is the water vapor transmission rate of the second outer layer,
   the recycling method comprising:
   washing the laminate with a solvent containing water; and
   separating the first outer layer and the second outer layer from each other.

3. The method according to claim 1, wherein, after separating the first outer layer and the second outer layer from each other, the first outer layer and the second outer layer are separately recovered.

4. The method according to claim 2, wherein, after separating the first outer layer and the second outer layer from each other, the first outer layer and the second outer layer are separately recovered.

5. The method according to claim 1, wherein:
the first outer layer has a WVTR of not greater than 100 cc·30 μm/m²·day, and
the second outer layer has a WVTR of 200 to 1000 cc·30 μm/m²·day.

6. The method according to claim 2, wherein:
the first outer layer has a WVTR of not greater than 100 cc·30 μm/m²·day, and
the second outer layer has a WVTR of 200 to 1000 cc·30 μm/m²·day.

7. The method according to claim 1, wherein:
the recycling method is for recycling a food packaging comprising the laminate,
the food packaging has one of the following structures:
(i) a structure wherein the second outer layer is brought into contact with food and the first outer layer is exposed to outside air; or
(ii) a structure wherein the first outer layer is brought into contact with food and the second outer layer is exposed to outside air, and
the method comprises:
washing the food packaging comprising the laminate with a solvent containing water; and
separating the first outer layer and the second outer layer from each other.

8. The method according to claim 2, wherein:
the recycling method is for recycling a food packaging comprising the laminate,
the food packaging has one of the following structures:
(i) a structure wherein the second outer layer is brought into contact with food and the first outer layer is exposed to outside air; or
(ii) a structure wherein the first outer layer is brought into contact with food and the second outer layer is exposed to outside air, and
the method comprises:
washing the food packaging comprising the laminate with a solvent containing water; and
separating the first outer layer and the second outer layer from each other.

* * * * *